United States Patent [19]

Hooser

[11] Patent Number: 5,365,986

[45] Date of Patent: Nov. 22, 1994

[54] CUTTER GRINDER

[76] Inventor: Steven M. Hooser, 15726 Ott Ave., Glen Ellyn, Ill. 60137

[21] Appl. No.: 23,552

[22] Filed: Feb. 26, 1993

[51] Int. Cl.⁵ .............................................. B27G 13/00
[52] U.S. Cl. ........................................ 144/231; 83/848; 83/851; 144/2 N; 144/218; 144/241; 144/235; 299/91; 407/118
[58] Field of Search ................. 83/846, 847, 848, 852, 83/853, 855; 407/118; 299/88, 89, 91, 92; 144/2 N, 34 R, 218, 231, 233, 235, 240, 241

[56] References Cited

U.S. PATENT DOCUMENTS

| | | | |
|---|---|---|---|
| 296,481 | 4/1884 | Stirckler | 144/240 |
| 338,695 | 3/1886 | Barnes | 144/240 |
| 612,526 | 10/1898 | Morgan | 144/240 |
| 2,259,015 | 10/1941 | Anderson et al. | 144/218 X |
| 2,600,272 | 6/1952 | Segal | 83/852 |
| 2,716,430 | 9/1955 | Pall | 144/235 |
| 2,845,102 | 7/1958 | Woudell | 144/235 |
| 2,925,108 | 2/1960 | Freeman | 144/235 |
| 3,198,224 | 8/1965 | Hiley | 144/2 N |
| 3,228,438 | 1/1966 | Serry | 144/218 X |
| 3,797,544 | 3/1974 | Ver Ploeg | 144/2 N |
| 4,269,244 | 5/1981 | Kinsella | 144/231 |
| 4,557,172 | 12/1985 | Yoneda | 83/848 |
| 4,697,625 | 10/1987 | Bolton | 144/2 N |
| 4,964,448 | 10/1990 | Schultz | 144/218 |
| 4,974,649 | 12/1990 | Manning | 144/241 |
| 5,034,407 | 7/1991 | Hooser | 144/2 N |
| 5,115,845 | 5/1992 | Hooser | 144/2 N |
| 5,269,355 | 12/1993 | Bowen | 144/2 N |

FOREIGN PATENT DOCUMENTS

| | | | |
|---|---|---|---|
| 10623 | 6/1928 | Australia | 144/240 |
| 34879 | 3/1906 | Switzerland | 144/233 |
| 803907 | 2/1981 | U.S.S.R. | |
| 1264871 | 10/1986 | U.S.S.R. | 144/2 N |
| WO91/04140 | 4/1991 | WIPO . | |

Primary Examiner—W. Donald Bray
Attorney, Agent, or Firm—Olson & Hierl, Ltd.

[57] ABSTRACT

A rotary cutter grinder that cuts and grinds upon its circumferential surface is well suited for stump grinding and the like applications. The rotary cutter grinder is constituted by a hub portion for mounting to the power output shaft of a prime mover and plural arms unitary with the hub portion. These arms are substantially uniformly spaced about the hub portion and extend radially outwardly therefrom. A cutting tool, usually a tungsten carbide cutting tool, is mounted to each of the arms at a positive rake angle relative to the perpendicular to the direction of motion by the cutting tool.

17 Claims, 3 Drawing Sheets

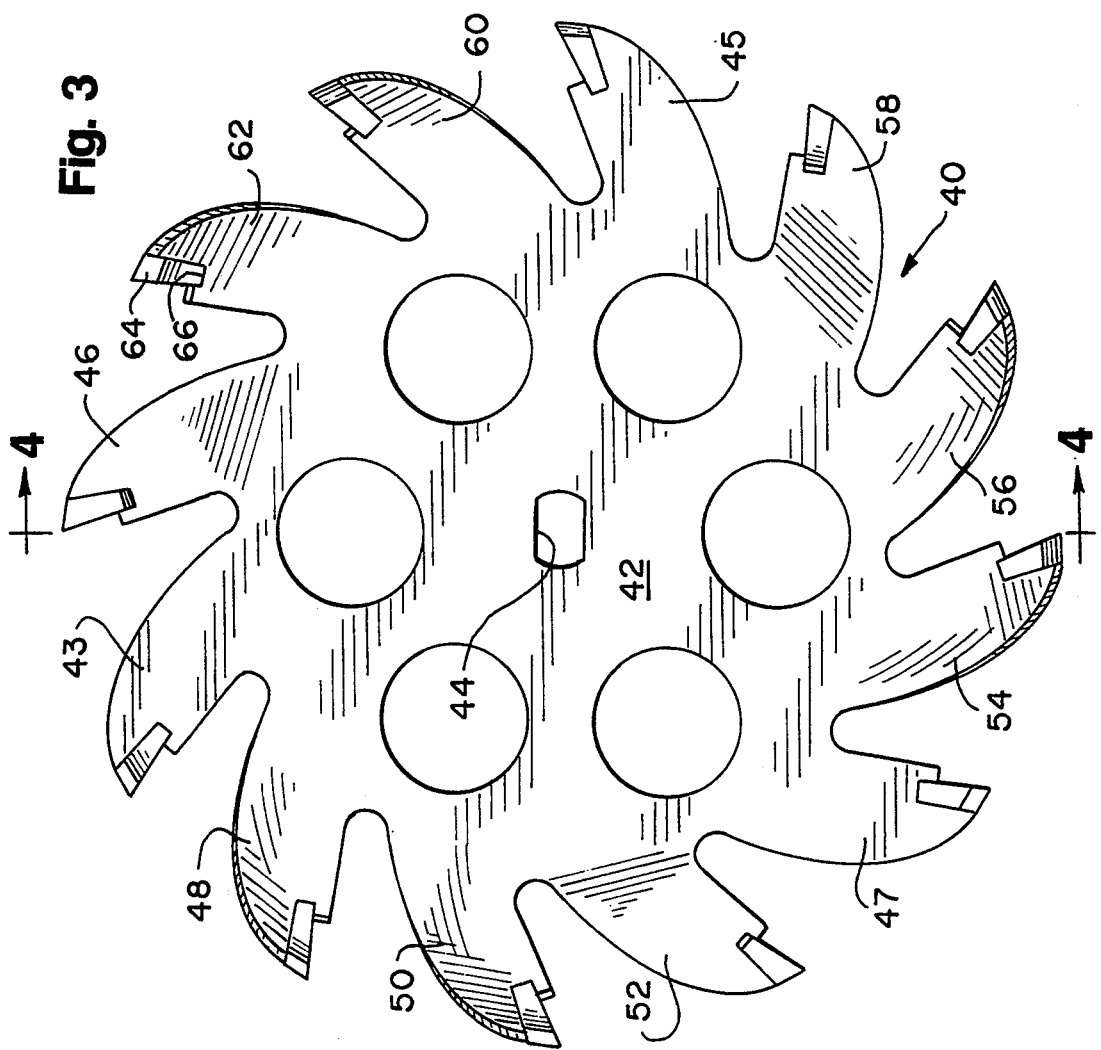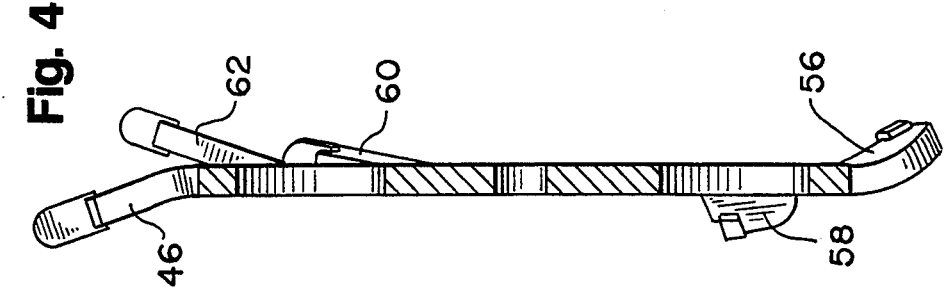

CUTTER GRINDER

TECHNICAL FIELD

This invention relates to grinding devices suitable for tree stump removal.

1. Background of the Invention

Portable tree stump removers are known in the art. Illustrative are those described in U.S. Pat. No. 5,034,407 and U.S. Pat. No. 5,115,845, both to Hooser. It is desirable to equip such tree stump removers with efficient cutter/grinder elements that permit the utilization of relatively light weight power heads and provide relatively smooth cutting and grinding action when in use. The present cutter grinder satisfies the foregoing desires.

2. Summary of the Invention

A cutter grinder eminently well suited for efficient stump removal is provided by the present invention. The cutter grinder is a rotatable cutting and/or grinding device constituted by a rigid hub portion, plural arms about the hub portion and unitary therewith, and a cutting tool for orthogonal cutting and grinding action mounted to each of the plural arms at a positive rake angle relative to the perpendicular to the direction of motion by the cutting tool. The aforementioned plural arms are substantially uniformly spaced about the hub portion and extend radially outwardly from the hub portion. The arms carrying the cutting tools may be coplanar with the hub portion or can be laterally offset therefrom, depending upon the desired width of produced kerf.

BRIEF DESCRIPTION OF THE DRAWINGS

In the drawings,

FIG. 3 is a plan view similar to that of FIG. 1 but showing another embodiment of the present invention;

FIG. 4 is a sectional view taken along plane 4—4 in FIG. 3;

DESCRIPTION OF PREFERRED EMBODIMENTS

The rotary cutter grinder contemplated by the present invention can be driven in use by a power source of the general type shown in U.S. Pat. No. 5,034,407 to Hooser and U.S. Pat. No. 5,115,845 to Hooser.

Figure 1:
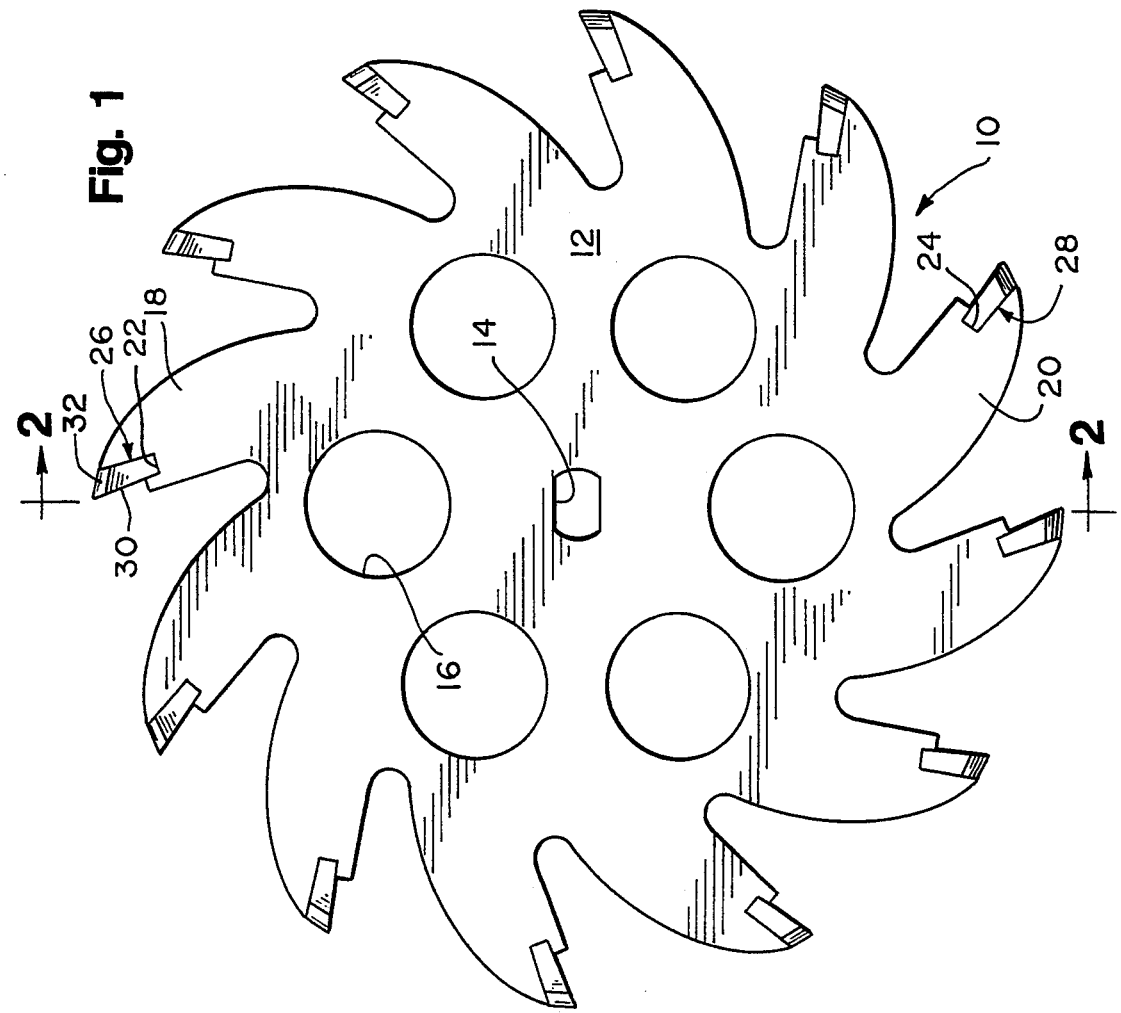
FIG. 1 is a plan view of a cutter grinder embodying the present invention and having a substantially flat configuration.
Figure 2:
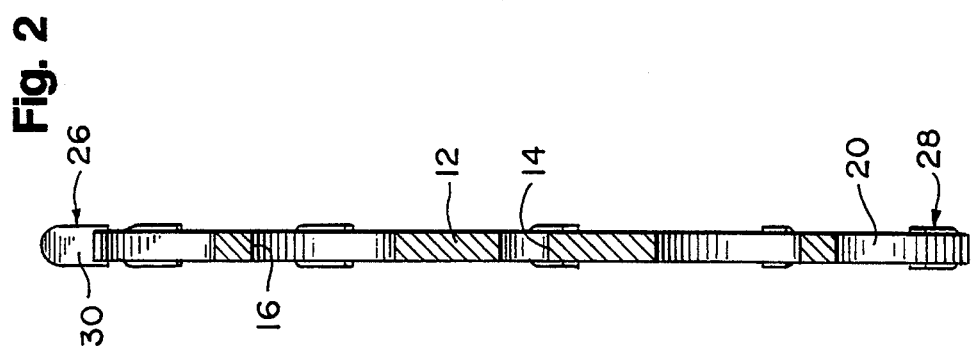
FIG. 2 is a sectional view taken along plane 2—2 in FIG. 1.

A rotary cutter grinder embodying the present invention and having a generally flat configuration is illustrated in FIGS. 1 and 2. As shown therein, cutter grinder 10, usually made of carbon steel such as AISI-SAE 1040 (UNS G 10400), has a rigid, apertured hub portion 12 that is substantially planar and is provided with a mounting aperture 14 for receiving a power shaft associated with a prime mover, as well as openings 16 that serve to reduce the overall weight of cutter grinder 10. Plural arcuate arms such as arms 18 and 20 are unitary with hub portion 12 and extend radially outwardly therefrom. These arms are substantially uniformly spaced about the periphery of the hub portion and serve to generate an air flow for chip control. Moreover, these arms are carrier arms and preferably are adapted to receive in distal sockets thereof the cutting tools that cut and grind away a stump portion that is in contact with a rotating cutter grinder. The sockets serve as retainers for the cutting tools and minimize the load placed on the joint between the arm and the tool as the cutter grinder is rotated in contact with a workpiece.

Specifically, tungsten carbide cutting tool 26 is received in socket or slot 22 at the distal end portion of arm 18 and tungsten carbide cutting tool 28 is received in similar socket or slot 24 of arm 20. These inlaid cutting tools are fixed in position and secured to their respective carrier arms by brazing or like expedients. The width of the cutting tools usually is about the same or slightly wider as the thickness of the carrier arm portion supporting it. If desired, additional arms serving as raker arms can be interspersed between the carrier arms.

Each cutting tool has a working face or rake that is inclined at a positive rake angle from the perpendicular to the direction of motion of the cutting tool when the cutter grinder rotates in use. The flank face or profile of each cutting tool is relieved to provide a clearance angle between the cutting tool and the workpiece as the cutter grinder is driven into the workpiece. The flank face and the rake together define an arcuate, continuous cutting edge of the tool. Vertex of the aforementioned rake angle is on the cutting edge and the rake angle is measured in a positive direction away from the aforesaid perpendicular.

In particular, referring again to FIG. 1, rake 30 of cutting tool 26 is mounted to arm 18 at a positive rake angle for counterclockwise rotation of cutter grinder 10. Flank face or profile 32 of cutting tool 26 is relieved to provide a relatively small clearance angle, usually about 5 degrees to about 15 degrees, between the flank face and a workpiece such as a wood stump.

As can be seen especially from FIG. 2, all arms extending radially outwardly from hub portion 12 are substantially coplanar with the hub portion. Such a configuration provides relatively rapid penetration albeit a relatively narrow kerf.

To achieve a relatively wider kerf, and thus more rapid stump grinding rate while attenuating vibrations, the carrier arms can be offset laterally, out of the plane of the hub portion. Such offsets can be symmetrical, as well as asymmetrical, relative to the plane of the hub portion.

An asymmetrical offset is preferred for stump grinding. One such asymmetrical offset with all cutting tools circumscribing the same cylinder of revolution is illustrated in FIGS. 3 and 4. Cutter grinder 40 is provided with coplanar carrier arms 43, 45 and 47 spaced about 120 degrees from one another and also coplanar as well as unitary with hub portion 42. On the other hand, carrier arms 46, 48, 50, 52, 54, 56, 58, 60 and 62 are laterally offset from the plane of hub portion 42. The offset carrier arms provide a spring action that attenuates vibrations generated as the cutter grinder in use is moved sideways across the tree stump.

Carrier arms 48, 50, 54, 56, 60 and 62 are laterally offset to one side of the plane of hub portion 42 while carrier arms 46, 52 and 58 are laterally offset to the other side of the plane of hub portion 42, thus providing a preferred opposing side offset ratio of 2:1. An opposing side offset ratio as high as 4:1 or as low as 1:1 can be used, if desired. Central aperture 44 is sized to receive the power shaft of a prime mover such as a gasoline-powered internal combustion engine. The cutting tools, such as cutting tool 64 received in socket 66 and permanently mounted to arcuate carrier arm 62, are substantially the same as those mounted to the flat cutter grinder 10 shown in FIGS. 1 and 2 and are positioned similarly to provide an array of cutting tools about the periphery of the cutter grinder.

The extent of the offset for the carrier arms can vary within relatively wide limits depending upon the power available at the power shaft and the desired kerf width. Usually the carrier arm offset from the plane of the hub portion is in the range of about 0.25 inch (6.35 mm) to about 1 inch (25.4 mm). Different offsets for the offset carrier arms on one side of the plane of the hub portion can be employed.

Figure 5:
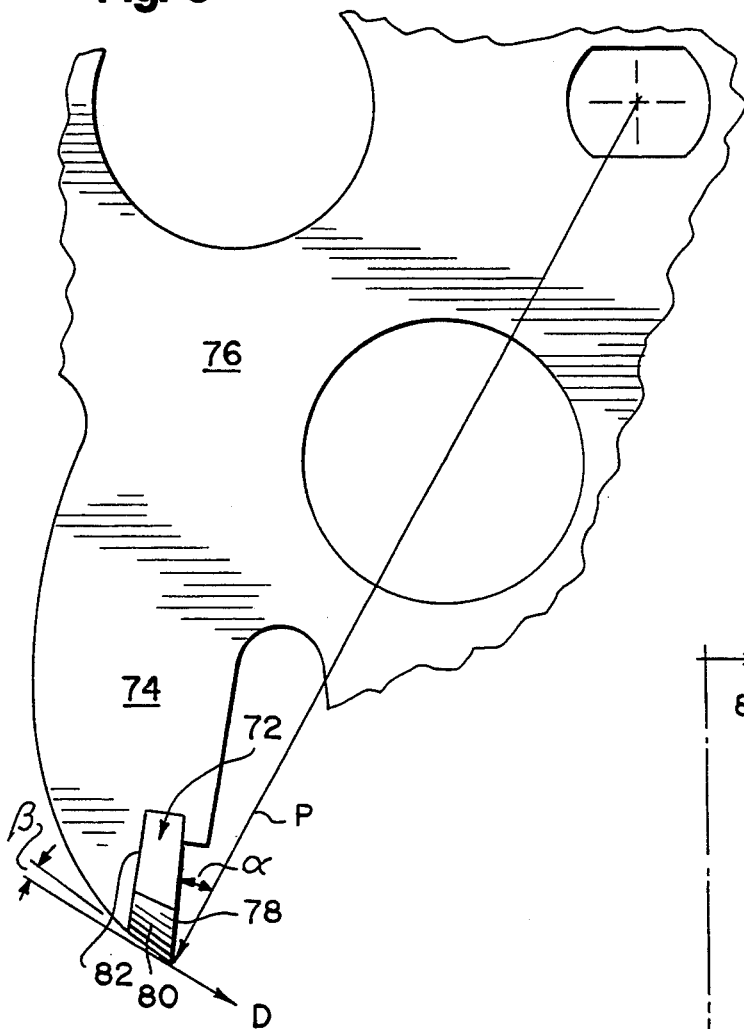
FIG. 5 is a fragmentary plan view of a cutter grinder portion carrying a cutting tool.

The positioning of the cutting tool in its corresponding carrier arm is further illustrated in FIG. 5 where generally tongue-shaped cutting tool 72 is mounted to carrier arm 74 unitary with rigid hub portion 76. Working face or rake 78 of cutting tool 72 is positioned at a positive rake angle $\alpha$ from the perpendicular P to the direction of motion denoted by tangent arrow D. Clearance angle $\beta$ is the angle between the apex of flank face 80 and the tangent arrow D. Included angle $\gamma$ is the angle between rake 78 and the apex of flank face 80 (FIG. 8).

For stump grinding purposes the preferred positive rake angle is in the range of about 10 degrees to about 30 degrees, more preferably about 20 degrees. The included angle between the rake and the apex of the flank face of the cutting tool preferably is about 60 degrees to about 40 degrees.

The rake and the flank face of the cutting tool together define an arcuate cutting edge that is movable into cutting contact with the tree stump. The cutting edge radius can be constant or variable, as desired. That is, the cutting edge can have a semi-circular contour, an elliptical contour, and the like. If desired, the rake can be provided with a concavity, i.e., a rounded or curved hollow, adjacent to the cutting edge.

Figure 6:
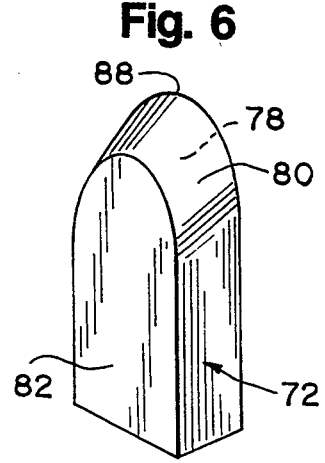
FIG. 6 is a perspective view of a cutting tool suitable for practicing the present invention.
Figure 7:
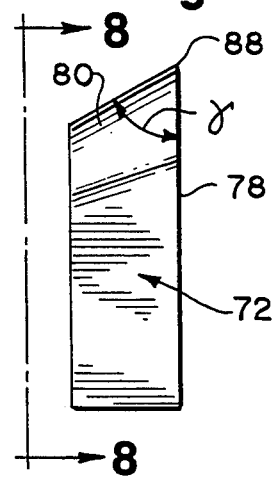
FIG. 7 is a side elevational view of the cutting tool shown in FIG. 6.
Figure 8:
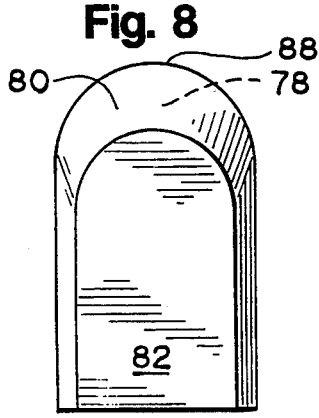
FIG. 8 is a front elevational view of the cutting tool shown in FIG. 6.

A typical cutting tool, shown in FIG. 5, is further illustrated in FIGS. 6–8. A generally tongue-shaped cutting tool 72 is shown having working face or rake 78 and flank face 80. Rake 78 and flank face 80 together define semi-circular cutting edge 88. Underside 82 is brazed to arm 74.

Figure 9:
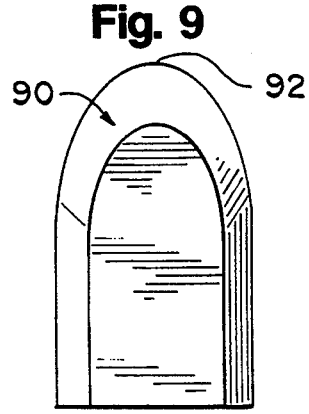
FIG. 9 is a front elevational view of a cutting tool similar to that shown in FIG. 6 but provided with a substantially elliptical cutting edge.
Figure 10:
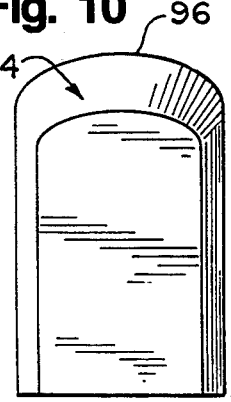
FIG. 10 is a front elevational view of yet another cutting tool suitable for the present purposes and having a substantially elliptical cutting edge.

Semi-elliptical cutting edges are shown in FIGS. 9 and 10. Cutting tool 90 in FIG. 9 is provided with a semi-elliptical cutting edge 92 along the relatively longer axis of the circumscribed ellipse. Cutting tool 94 in FIG. 10 is provided with a semi-elliptical cutting edge 96 along the relatively shorter axis of the circumscribed ellipse.

The cutting tool is a hard, wear-resistant material, usually a refractory material such as cemented carbides. Tool hardness is preferably in the range of about 85 to about 90 Rockwell A hardness units (HRA), more preferably about 88.7 HRA. Such hardness can be readily achieved utilizing straight tungsten carbide-cobalt garde materials that are constituted by tungsten carbide particles bonded with cobalt and having carbide grain sizes in the range of about 0.5 micrometers ($\mu$m) to about 5 $\mu$m. One such suitable cutting tool material is commercially available from Border City Tool & Mfg. Co., Warren, Mich. 48089, U.S.A.

The foregoing specification and the accompanying drawings are intended as illustrative but are not to be taken as limiting. Still other variations and rearrangements of parts are possible without departing from the spirit and scope of this invention.

I claim:

1. A rotatable cutting device suitable for stump grinding which comprises:
   a rigid hub portion;
   plural arms unitary with said hub portion, substantially uniformly spaced about the hub portion and extending radially outwardly from said hub portion; and
   a cutting tool mounted to each of said plural arms, the mounted cutting tools together providing an array of cutting tools about the periphery of the cutting device;
   each said cutting tool having a flank face and a working face together defining an arcuate cutting edge and being mounted to the arm at a positive rake angle.

2. The cutting device in accordance with claim 1 wherein the rake angle is in the range of about 10 to about 30 degrees.

3. The cutting device in accordance with claim 1 wherein the rake angle is about 20 degrees.

4. The cutting device in accordance with claim 1 wherein the included angle between the cutting face and the base is about 60 degrees to about 40 degrees.

5. The cutting device in accordance with claim 1 wherein said arms are substantially coplanar.

6. The cutting device in accordance with claim 1 wherein some of said arms are laterally offset relative to one another.

7. The cutting device in accordance with claim 1 wherein three of said arms are substantially coplanar with said hub portion and are peripherally spaced about 120 degrees from one another and the remaining arms are laterally offset relative to said coplanar arms.

8. The cutting device in accordance with claim 7 wherein the laterally offset arms are offset in opposite directions from the plane of the hub portion and the arms substantially coplanar therewith, and the number of arms offset in one said direction is greater than the number of arms offset in the other said direction.

9. The cutting device in accordance with claim 7 wherein the total number of laterally offset arms is nine and wherein six of said nine arms are offset in one direction and three of said nine arms are offset in the opposite direction from said one direction.

10. The cutting device in accordance with claim 1 wherein the cutting tool is tongue-shaped.

11. The cutting device in accordance with claim 10 wherein the cutting edge is substantially semi-circular.

12. The cutting device in accordance with claim 10 wherein the cutting edge is substantially semi-elliptical.

13. The cutting device in accordance with claim 1 wherein a socket is defined by each said arm and wherein a portion of said cutting tool is received within said socket.

14. The cutting device in accordance with claim 13 wherein said socket is a slot defined by said arm at the distal end portion thereof.

15. A rotatable cutter grinder which comprises:
   a rigid, substantially planar hub portion;
   plural arcuate arms unitary with said hub portion, substantially uniformly spaced about the hub portion, and at least some of the arms being laterally offset relative to the plane of the hub portion; and
   a cutting tool mounted at a positive rake angle to each of said plural arms at a distal end portion thereof so as to provide an array of cutting tools about the periphery of the cutter grinder.

16. The rotatable cutter grinder in accordance with claim 15 wherein each said cutting tool has a flank face and a working face together defining an arcuate cutting edge.

17. The rotatable cutter grinder in accordance with claim 15 wherein the arcuate arms are offset asymmetrically relative to the plane of the hub portion.

* * * * *